A. BUTSCH.
INTERNAL COMBUSTION ENGINE.
APPLICATION FILED SEPT. 9, 1910.
998,463.
Patented July 18, 1911.
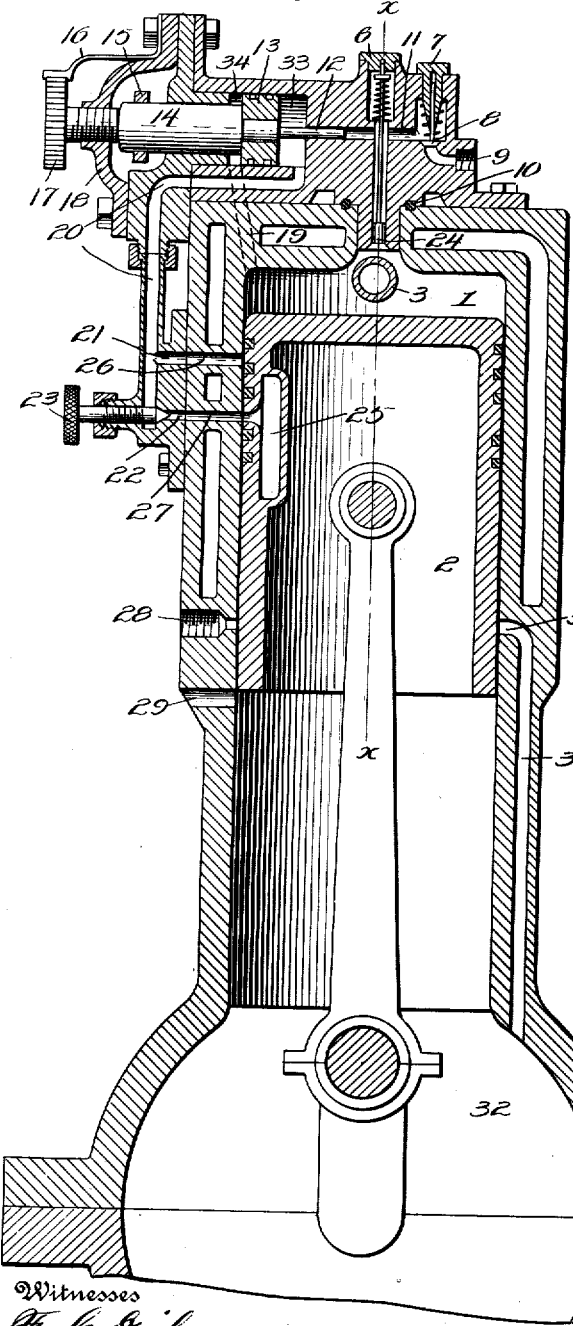
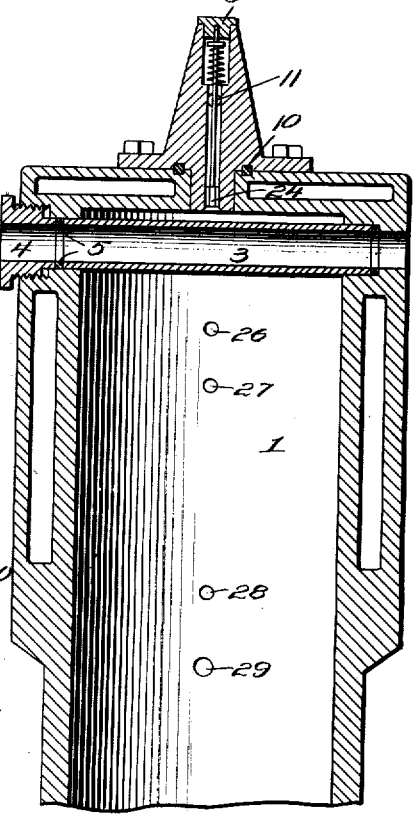
Inventor
Alphonse Butsch.
Witnesses
F. C. Gibson.
U. B. Hillyard.
By Victor J. Evans
Attorney

UNITED STATES PATENT OFFICE.

ALPHONSE BUTSCH, OF ST. LUCIA, BRITISH WEST INDIES.

INTERNAL-COMBUSTION ENGINE.

998,463.

Specification of Letters Patent. Patented July 18, 1911.

Application filed September 9, 1910. Serial No. 581,128.

*To all whom it may concern:*

Be it known that I, ALPHONSE BUTSCH, a citizen of no country, residing at St. Lucia, British West Indies, have invented new and useful Improvements in Internal-Combustion Engines, of which the following is a specification.

The present invention provides an engine of the explosive or internal combustion type, which is practically valveless in contradistinction to engines of this type requiring valves for controlling the inlet and the exhaust.

The invention is designed to provide an engine of the character specified which involves an extremely simple construction and in which the ignition of the gaseous mixture is effected by means of a red hot igniter, the latter being arranged so as not to present any exposed part, the invention also providing for control of speed and power according to the results to be attained and the engine being of such construction as to run equally well in either direction.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a vertical central section of an engine of the type aforesaid embodying the invention. Fig. 2 is a section on the line *x—x* of Fig. 1.

Corresponding and like parts are referred to in the following description, and indicated in all the views of the drawing, by the same reference characters.

The numeral 1 designates the cylinder which may be of any construction and size and which has an explosion end made hollow for the circulation of a cooling medium in the well known manner.

2 indicates a piston which is arranged to operate within the cylinder and which is provided with an expansion chamber 25. A hollow ignition tube 3 is supported at its ends in openings formed in opposite walls of the cylinder near the closed end thereof. A hollow nut 4 retains the ignition tube 3 in place and packing gaskets 5 of asbestos or other material are located at the ends of the ignition tube. A passage is formed in the head or closed end of the cylinder and receives a valve 24, which controls the delivery of fuel to the engine. The stem of the fuel delivery valve 24 operates in an opening formed in a hollow nut 6 and a spring coöperates with said stem to normally hold the valve 24 seated. The valve 24 is located in line with the ignition tube 3. A passage 11 intersects the opening controlled by the fuel delivery valve 24 and also constitutes the cylinder of the fuel pump. A spring actuated fuel inlet valve 8 closes the passage 11 so as to shut off communication between said passage and the fuel inlet 9, the latter being connected in the usual way with the source of fuel supply. A hollow nut 7 receives the stem of the fuel inlet valve 8. A packing gasket 10 is interposed between the head of the cylinder and the casting fitted thereto and which casting is formed with the several passages. The fuel pump comprises a plunger 12, which is of comparatively small diameter and arranged to operate in a part of the passage 11 forming the cylinder. The fuel pump is actuated in the operation of the engine by means of a motor, the latter comprising a piston 13 and a cylinder in which said piston is arranged to operate. The plunger 12 projects from the piston 13. A stem 14 of larger diameter than the plunger 12 projects from the opposite face of the piston 13, with the result that said piston 13 presents faces of different areas. The cylinder in which the piston 13 operates comprises chambers 33 and 34, the chamber 33 corresponding to the face of the piston presenting the larger area and the chamber 34 facing the side of the piston 13 presenting the smaller area. A set collar 15 is threaded upon the stem 14 and limits the instroke of the piston 13. A set screw 17 threaded into a support 18 regulates the outstroke of the piston 13 by engaging with the stem 14. The head of the set screw 17 has its outer edge notched and a spring arm 16 is adapted to engage the notches formed in the head of the set screw to hold the latter in the adjusted position. By proper adjustment of the set collar 15 and set screw 17 the stroke of the plunger 12 of the fuel pump may be regulated to supply the required amount of fuel to the engine at each stroke according to the load or work to be performed. A passage 20 connects the chamber 33 with ports 21 and 22, the port 22 being controlled by means of a needle valve 23. Passages 26 and 27 formed in a wall of the cylinder 1 register with respectively ports 21 and 22. A passage 19 establishes communication between the chamber 34 and the end of the cylinder 1. The crank case 32 connects with the open end of the cylinder 1 and a passage 31 establishes communication between the crank case and a port 30 opening into the cylinder.

29 designates an inlet port and 28 an exhaust port.

The operation of the engine is as follows: Air is admitted into the crank case 32 through the port 29 at the end of the instroke. During the next outstroke the port 29 is masked and the air compressed in the crank case. At the end of the outstroke port 30 is unmasked, thus allowing the air from the crank case 32 to pass up through the passage 31 and enter the cylinder through the port 30. The piston then moves upward, masking the port 30 and also the exhaust port 28 and compressing the air now in the cylinder. Some of this air will pass out through the passage 26 up the passage 20 into the cylinder 33, thus acting on the front face of the piston 13. Some air will also enter through the passage 19 (shown by dotted lines) and reach the rear face of piston 13 into the annular space 34. Now it will be noticed that the front face of said piston 13 presents a much larger area to the compressed air than the rear face, thus keeping the piston firmly in the position shown in Fig. 1, the rod 14 pressing against the screw 17. Toward the end of the instroke passage 26 is suddenly masked by the piston and when the crank reaches on the center line the lower passage 27 comes into alinement with the expansion chamber 25. If now the needle valve 23 is open the compressed air in the cylinder 33 will instantly expand through the passage 20 into the chamber 25, thus relieving the pressure on the front face of the piston 13. The compressed air now acting on the rear face 34 of the piston 13 with considerable pressure will drive said piston immediately inward, thus operating the oil pump plunger 12, which is integral with it, and delivering a charge of oil through the valve 24 into the cylinder of the engine. The oil on escaping from the edges of the valve 24 mixes with the air, which by a compression of two hundred pounds or more has become sufficiently heated to instantly vaporize the kerosene. Some of the fuel striking the red hot tube 3 will produce the ignition. This tube 3 is heated before starting by applying the flame of a gasolene torch to the interior of it. Once the engine is started the torch may be removed as the explosion will keep the tube 3 hot enough. The exploded gases will now drive the piston down. As soon as the passage 26 becomes unmasked again the pressure in the cylinder will be communicated to the front face of the piston 13, thus instantly driving it out against the screw 17 and thus drawing a new charge of fuel into the pump casing 11 through the valve 8. Toward the end of the outstroke the expansion chamber 25 passes over the main exhaust port 28, thus allowing the pressure in the chamber 25 to lower to atmospheric pressure. At the end of the outstroke the burned gases exhaust through port 28 and the new charge of compressed air from the crank case passes in at 30, thus repeating the cycle of operation. This engine is self-controlling, no governor of any kind being here required, the speed being determined by the setting of the needle valve 23. In order that the oil pump may act it is necessary that the pressure in chamber 33 fall below the pressure in the chamber 34. Now it can easily be imagined that if the engine is running say at four hundred revolutions per minute and the valve 23 is set in such a way that the pressure in the chamber 33 will just barely drop below the pressure in the chamber 34 with the result that the pump will just act and even once in a while fail to act, it is evident under these conditions that any increase of the speed of the engine by reducing the time of alinement between passage 27 and the chamber 25 would prevent the pressure in the chamber 33 from dropping sufficiently below the pressure in chamber 34 and throw the fuel pump out of action, thus positively limiting the speed. It is also evident that if under the above conditions the valve 23 was set still closer, the pump would also cease acting until the engine had sufficiently slowed down to leave the chamber 25 and the port 27 long enough in alinement to allow the compressed air to pass out of the chamber 33 by the now decreased passage of the needle valve 23.

The power of the engine can here readily be altered to suit any load at any speed by altering the amount of fuel injected by means of the thumb screw 17 which controls the length of the pump stroke. As the fuel during injection is here only mixed with a small part of the total air supply, even the smallest amount of kerosene injected will positively explode.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In an internal combustion engine comprising a cylinder and a piston arranged to reciprocate therein, a fuel pump for supplying the engine with fuel, and a motor for the fuel pump comprising a cylinder with opposite ends in communication with the engine cylinder and a piston having opposite faces of different areas arranged within the cylinder and adapted to be actuated by the compression and expansion of the gases in the cylinder of the engine.

2. In an internal combustion engine comprising a cylinder and a piston arranged to reciprocate therein, a fuel pump for charging the cylinder and a motor for actuating the fuel pump, said motor comprising a piston having opposite faces of different areas and a cylinder having its opposite ends in communication by passages with the engine cylinder, the piston of the engine having an expansion chamber which is adapted to register with the passage leading from the end of the motor cylinder facing the larger side of the motor piston.

3. An internal combustion engine comprising a cylinder, a piston arranged to operate therein and having an expansion chamber, a fuel pump for charging the engine cylinder, a motor for operating said fuel pump, said motor comprising a piston having opposite faces of different areas and a cylinder receiving said piston, said cylinder having passages leading from opposite ends into the engine cylinder, the passage leading from the end of the cylinder facing the larger side of the motor piston being adapted to register with the expansion chamber of the engine piston, and a valve for regulating the effective size of the passage adapted to communicate with said expansion chamber.

4. An internal combustion engine comprising a cylinder, a piston arranged to operate therein and having an expansion chamber, a fuel pump for charging the engine, a motor for the fuel pump comprising a cylinder and a piston, the latter operating in the motor cylinder and having faces of different areas, the motor cylinder having opposite ends in communication with the engine cylinder and having the passage leading from the end of the cylinder facing the larger side of the motor piston adapted to register with the expansion chamber of the engine piston, a valve for regulating said passage, and means for varying the stroke of the motor piston.

5. An internal combustion engine comprising a cylinder, a piston arranged to operate therein and provided with an expansion chamber, a fuel pump for charging the engine, inlet and delivery valves for controlling the supply of fuel to the engine, a motor for the fuel pump comprising a cylinder and a piston arranged to operate in the cylinder and having opposite faces of different areas, the end of the motor cylinder facing the larger side of the piston adapted to communicate with the engine cylinder at two points, one of which is adapted to register with the expansion chamber of the piston, and a valve for regulating the opening adapted to register with said expansion chamber, and the opposite end of the motor cylinder having a passage leading therefrom and communicating with the said engine cylinder, and means for regulating the stroke of the motor piston and the stroke of the fuel pump.

In testimony whereof I affix my signature in presence of two witnesses.

ALPHONSE BUTSCH.

Witnesses:
R. J. H. CLARKE,
W. R. MYERS.